United States Patent
Kobayashi

(10) Patent No.: US 10,218,417 B2
(45) Date of Patent: Feb. 26, 2019

(54) COMMUNICATION DEVICE, COMMUNICATION SYSTEM, AND COMMUNICATION METHOD

(71) Applicant: FUJITSU LIMITED, Kawasaki-shi, Kanagawa (JP)

(72) Inventor: Takaharu Kobayashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/913,510

(22) Filed: Mar. 6, 2018

(65) Prior Publication Data

US 2018/0269938 A1    Sep. 20, 2018

(30) Foreign Application Priority Data

Mar. 14, 2017  (JP) .................................. 2017-048165

(51) Int. Cl.
    *H04B 7/0456*  (2017.01)
    *H04B 7/0452*  (2017.01)
    (Continued)

(52) U.S. Cl.
    CPC ......... *H04B 7/0452* (2013.01); *H04B 7/0632* (2013.01); *H04L 25/0224* (2013.01); *H04L 25/0258* (2013.01)

(58) Field of Classification Search
    USPC .......................................... 375/260; 370/329
    See application file for complete search history.

(56) References Cited

U.S. PATENT DOCUMENTS

| | | | | |
|---|---|---|---|---|
| 9,313,007 | B2 * | 4/2016 | Kudo | .................. H04B 7/0456 |
| 2002/0070892 | A1 * | 6/2002 | Kikuchi | ................. H01Q 1/246 |
| | | | | 342/368 |
| 2008/0130790 | A1 | 6/2008 | Forenza et al. | |
| 2009/0262843 | A1 * | 10/2009 | Krasny | ................ H04B 7/0619 |
| | | | | 375/260 |

(Continued)

FOREIGN PATENT DOCUMENTS

| | | |
|---|---|---|
| JP | 2010-537577 A | 12/2010 |
| JP | 2013-201633 A | 10/2013 |
| JP | 2014-075679 A | 4/2014 |

OTHER PUBLICATIONS

Seyama, T., et al., "Study of Coordinated Radio Resource Scheduling Algorithm for 5G Ultra High-Density Distributed Antenna Systems", IEICE Technical Report, pp. 181-186, 2016.

*Primary Examiner* — Eva Y Puente
(74) *Attorney, Agent, or Firm* — Arent Fox LLP

(57) ABSTRACT

A communication device that is configured to: compute reflected transmission weights based on timing correction coefficients to be applied to each of a plurality of antennas according to reception timings of uplink signals from a plurality of wireless terminals that receive multiplexed downlink signals transmitted from the plurality of antennas, and on respective channel estimation values between the plurality of antennas and the plurality of wireless terminals, the computed reflected transmission weights reflecting the timing correction coefficients and being computed at first frequency intervals; compute interpolated transmission weights by interpolating between the computed reflected transmission weights at second frequency intervals that are narrower than the first frequency intervals; and compute transmission weights to be applied to downlink signals by, based on the timing correction coefficients, correcting the interpolated transmission weights that have been interpolated such that the timing correction coefficients are reflected a second time.

18 Claims, 10 Drawing Sheets

(51) Int. Cl.
*H04B 7/06* (2006.01)
*H04L 25/02* (2006.01)

(56) References Cited

U.S. PATENT DOCUMENTS

| | | | | |
|---|---|---|---|---|
| 2014/0233522 | A1* | 8/2014 | Tokairin | H04L 1/0003 |
| | | | | 370/329 |
| 2016/0119909 | A1* | 4/2016 | Fukuzono | H04W 16/28 |
| | | | | 370/329 |
| 2017/0353210 | A1* | 12/2017 | Pratt | H04B 7/0626 |
| 2018/0026690 | A1* | 1/2018 | Jitsukawa | H04B 7/0613 |
| 2018/0123667 | A1* | 5/2018 | Taira | H04J 11/00 |

* cited by examiner

COMMUNICATION DEVICE, COMMUNICATION SYSTEM, AND COMMUNICATION METHOD

CROSS-REFERENCE TO RELATED APPLICATION

This application is based upon and claims the benefit of priority of the prior Japanese Patent Application No. 2017-048165, filed on Mar. 14, 2017, the entire contents of which are incorporated herein by reference.

FIELD

The embodiments discussed herein are related to a communication device, a communication system, and a communication method.

BACKGROUND

There are ongoing investigations into joint transmission multi-user multi-input multi-output (JT-MU-MIMO), which combines joint transmission (JT) with multi-user multi-input multi-output (MU-MIMO). Joint transmission is implemented using transmission points (referred to as TPs below) that have been arranged at different locations, and in MU-MIMO, spatial multiplexing is used to transmit downlink signals to plural communication terminals (referred to as user equipment (UE) below). In JT-MU-MIMO, in order to reduce downlink signal interference between UEs receiving spatially multiplexed downlink signals, at the TPs, transmission signals are multiplied by transmission weights acquired using zero-forcing (ZF) or an orthogonalization technique such as block-diagonalization.

Differences in propagation delays arise between TPs and UEs as a result of differing propagation distances between each TP and the UEs. For example, when a downlink signal is transmitted from a second TP to a UE while a downlink signal is being transmitted from a first TP to the UE, the following occurs. If the distance between the second TP and the UE is longer than the distance between the first TP and the UE, then the downlink signal transmitted from the second TP is received by the UE at a delay with respect to the downlink signal transmitted from the first TP.

In such cases, the received phase of the downlink signal transmitted from the second TP is rotated in the frequency domain with respect to the received phase of the downlink signal transmitted from the first TP. Namely, the downlink signals transmitted from the two TPs are received at the UE with a different phase difference at each frequency, and since the interference between the downlink signals from the two TPs is frequency dependent, the optimal transmission weights are frequency dependent.

In order to acquire optimal frequency-dependent transmission weights, in other technology, for example, the frequency band is divided into predetermined band segments and a transmission weight is computed for each segment. However, processing load increases as the number of segments increases.

There is also technology in which transmission weights are first computed without increasing the number of segments, namely, without narrowing the given bands in each segment division, and then frequency intervals are narrowed and transmission weights interpolated. However, in such technology, it is difficult to interpolate transmission weights with appropriate values approximating the optimal transmission weights when there are large differences in propagation delays.

RELATED PATENT DOCUMENTS

Japanese Patent Application Laid-Open (JP-A) No. 2013-201633 JP-A 2014-075679

RELATED NON-PATENT DOCUMENTS

"Study of Coordinated Radio Resource Scheduling Algorithm for 5 G Ultra High-Density Distributed Antenna Systems", by Seyama et al., IEICE technical report, Japan, March 2016, RCS2015-363, pages 181 to 186.

SUMMARY

According to an aspect of the embodiments, a communication device comprising: a memory; and a processor connected to the memory, the processor being configured to: compute reflected transmission weights based on timing correction coefficients to be applied to each of a plurality of antennas according to reception timings of uplink signals from a plurality of wireless terminals that receive multiplexed downlink signals transmitted from the plurality of antennas, and on respective channel estimation values between the plurality of antennas and the plurality of wireless terminals, the computed reflected transmission weights reflecting the timing correction coefficients and being computed at first frequency intervals; compute interpolated transmission weights by interpolating between the computed reflected transmission weights at second frequency intervals that are narrower than the first frequency intervals; and compute transmission weights to be applied to downlink signals by, based on the timing correction coefficients, correcting the interpolated transmission weights that have been interpolated such that the timing correction coefficients are reflected a second time.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed description follows regarding an example first exemplary embodiment, with reference to the drawings.

Figure 1:
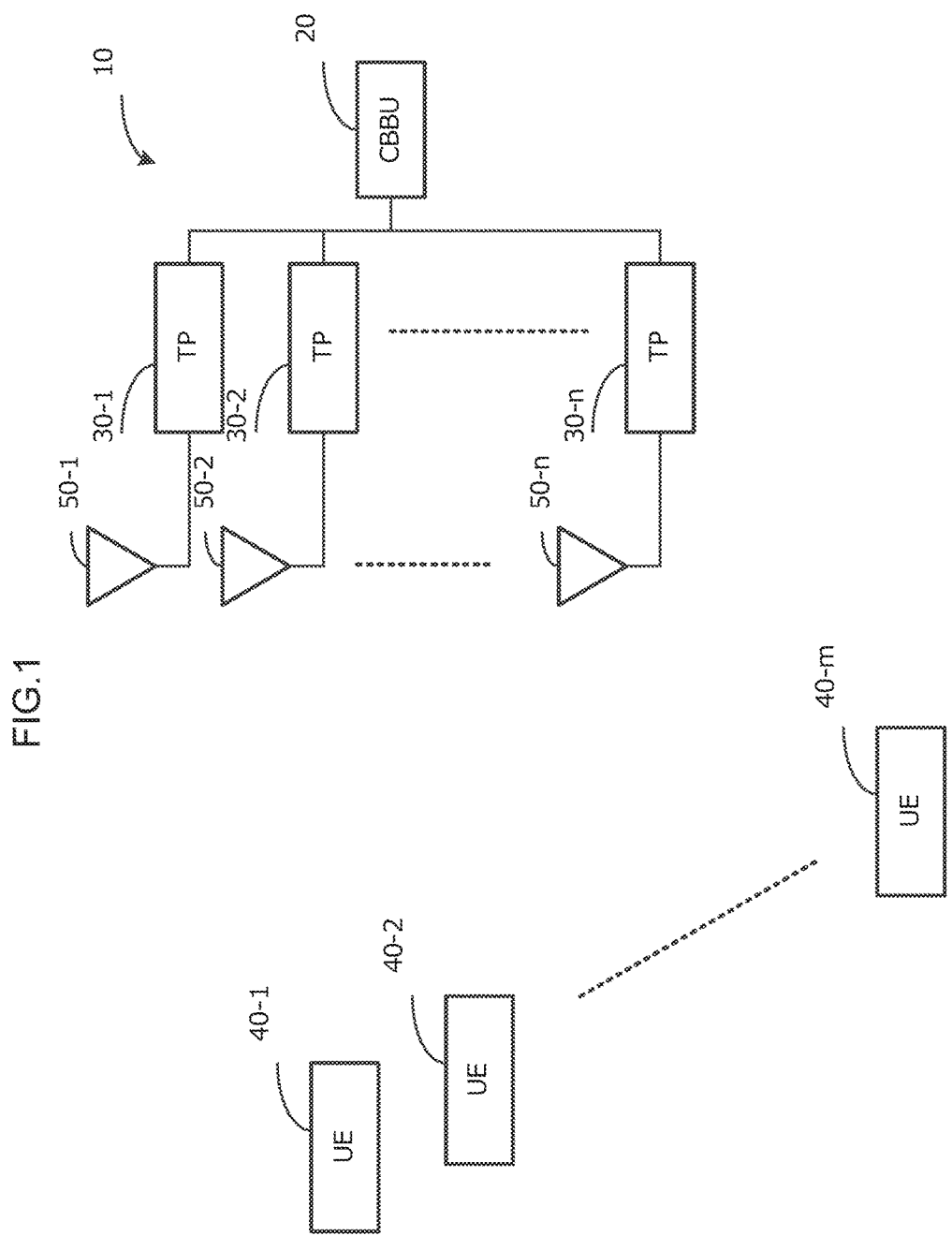
FIG. 1 is a block diagram illustrating an example of a communication system according to first and second exemplary embodiments and plural UEs.

FIG. 1 illustrates an example of a communication system 10 of the present exemplary embodiment and m wireless terminals (referred to as user equipment (UE) below) 40-1, 40-2, ..., 40-m. Reference to a particular UE will be expressed as UE 40-i. i is a number to distinguish between UEs, with i=1, ..., m. Reference will also be made to UEs 40 when there is no need to distinguish which UEs are being referred to. The communication system 10 includes a centralized base band unit (CBBU) 20, serving as an example of a communication device, n transmission sections (referred to as transmission points (TPs) below) 30-1, 30-2, ..., 30-n connected to the CBBU 20, and antennas 50-1, 50-2, ..., 50-n. Reference to a particular TP will be expressed as TP 30-k, and reference to a particular antenna will be expressed as antenna 50-k. k is a number to distinguish between TPs and antennas, with k=1, ..., n. Reference will be also be made to TPs 30 and antennas 50 when there is no need to distinguish which TPs or which antennas are being referred to. Each antenna 50-k is connected to the respective TP 30-k. Note that m and n may be any integer equal to two or more.

Figure 2:
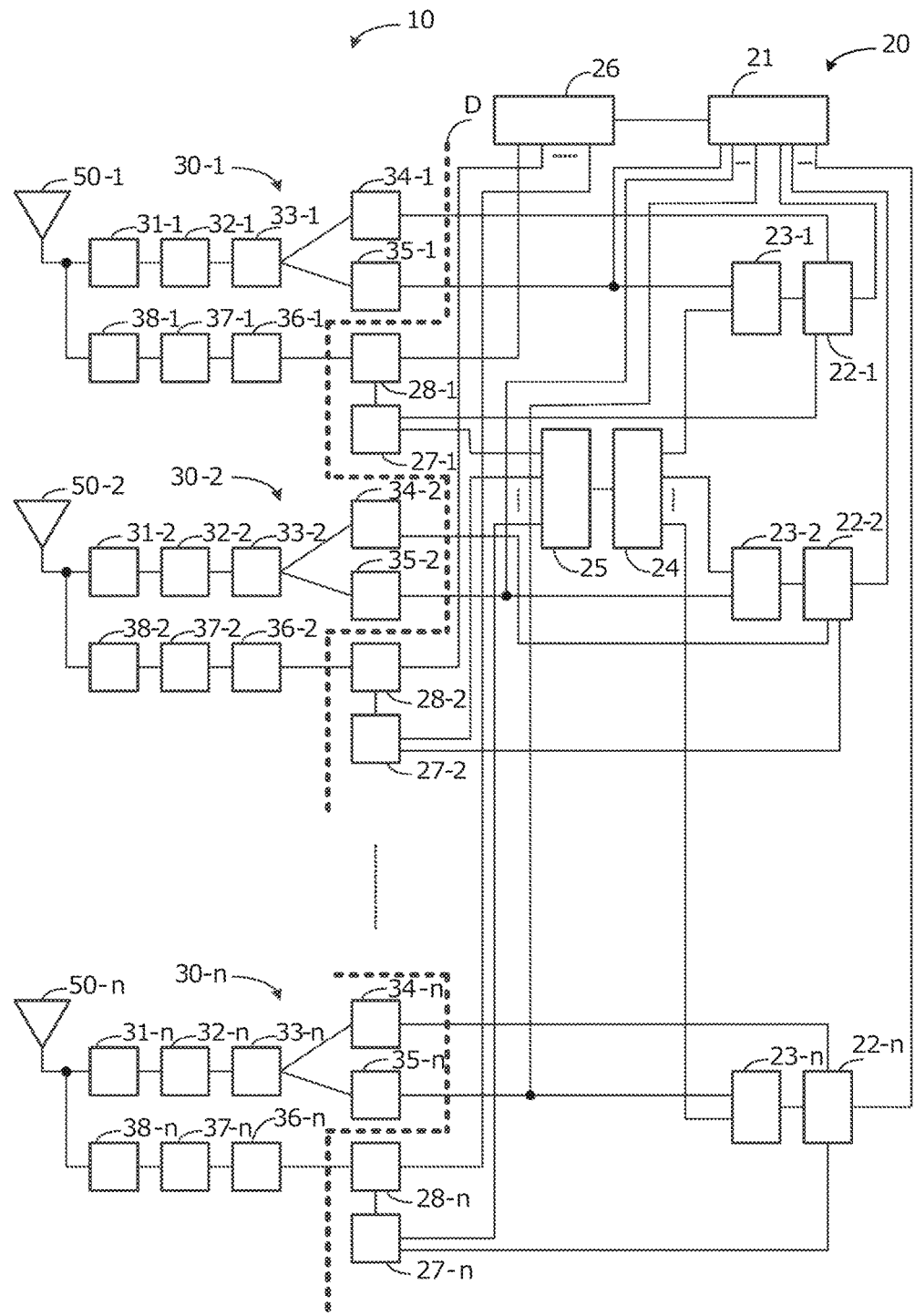
FIG. 2 is a block diagram illustrating an example of relevant functionality of a communication system according to the first exemplary embodiment.

A CBBU 20 is illustrated on the right side of the broken line D in FIG. 2, and TPs 30-k (k=1, ..., n) are illustrated on the left side of the broken line D. Where there are plural sections illustrated in the drawings having similar operation, such as timing correction coefficient acquisition sections, the suffix k will be appended when indicating one of the sections in the description below. The CBBU 20 includes a scheduling section 21, timing correction coefficient acquisition sections 22-k, channel estimation value correction sections 23-k, a transmission weight computation section 24, a transmission weight interpolation section 25, a user data generation section 26, transmission weight correction sections 27-k, and transmission weight multiplication sections 28-k. The channel estimation value correction sections 23-k and the transmission weight computation section 24 serve as an example of a computation section.

Each TP 30-k includes an uplink wireless processing section 31-k, a cyclic prefix (CP) removal section 32-k, a fast Fourier transform (FFT) section 33-k, a reception timing detection section 34-k, and a channel estimation section 35-k. Each TP 30-k also includes an inverse fast Fourier transform (IFFT) section 36-k, a CP appending section 37-k, and a downlink wireless processing section 38-k.

The uplink wireless processing section 31-k performs down conversion and analog-to-digital (A/D) conversion on a received signal, which is an uplink signal transmitted from a UE 40 that has been received by antenna 50-k. The CP removal section 32-k removes CP from the received signal. The FFT section 33-k performs fast Fourier transformation (FFT) on the received signal to convert the received signal into a signal in the frequency domain.

In each of the n TPs, the channel estimation section 35-k employs a known signal, such as a sounding reference signal (SRS), contained in the received signal to perform uplink channel estimation for each resource block (referred to as RB below) for the m UEs 40. The channel estimation section 35-k then converts an acquired uplink channel estimation value between a UE 40-i and the antenna 50-k into a downlink channel estimation value $h_{i,k}(r)$, as expressed by Equation (1). r is a number to distinguish between resource blocks, with r=1, ..., N_RB. N_RB indicates the number of RBs.

$$h_{i,k}(r) = C_{i,k}(r) \cdot \tilde{h}_{i,k}(r) \quad (1)$$

In Equation (1), the $h_{i,k}(r)$ with a tilde "~" on top is referred to below as "tilde $h_{i,k}(r)$". Tilde $h_{i,k}(r)$ is an uplink channel estimation value for RB number r between UE 40-i and antenna 50-k. $C_{i,k}(r)$ is a coefficient for converting an uplink channel estimation value to a downlink channel estimation value. $C_{i,k}(r)$ is determined so as to adjust for a difference between an uplink signal transmission power and a downlink signal transmission power, and for a difference between an uplink circuit response and a downlink circuit response.

The reception timing detection section 34-k employs a known signal, such as an SRS, to detect a reception timing $\tau_{i,k}$ at the antenna 50-k of an uplink signal from a UE 40-i to the antenna 50-k. The reception timing $\tau_{i,k}$ corresponds to an amount of propagation delay between a UE 40-i and a TP 30-k. For example, when there is a long propagation distance between a UE 40-i and a TP 30-k, and there is a large amount of propagation delay, reception timing will be delayed. A reception timing $\tau_{i,k}$ at each of the n antennas is detected for each of the m UEs.

Based on the downlink channel estimation values $h_{i,k}(r)$ acquired by the channel estimation section 35-k, the scheduling section 21 selects UEs 40 for multiplexed signal transmission from out of the m UEs 40 being scheduled.

Based on the reception timing $\tau_{i,k}$ detected by the reception timing detection section 34-k and information relating to the UEs 40 selected by the scheduling section 21 for multiplexed signal transmission, the timing correction coefficient acquisition section 22-k determines a timing correction coefficient $\tau\_c_k$ for the antenna 50-k. As expressed by Equation (2), the timing correction coefficient $\tau\_c_k$ may, for example, be the reception timing $\tau_{i,k}$ for which the interval of time between a multiplexed signal transmission and a corresponding reception timing is smallest, namely the timing correction coefficient $\tau\_c_k$ may be the reception timing $\tau_{i,k}$ corresponding to the UE 40-i for which the reception timing at antenna 50-k is earliest. The reason for this is that received power $p\_rx_{i,k}$ is strongest for UEs 40 having the earliest reception timings, and phase rotation suppression can be expected.

$$\tau\_c_k = \min_{i \in M}(\tau_{i,k}) \quad (2)$$

M is the collection of UEs 40 selected by the scheduling section 21 for multiplexed signal transmission.

The channel estimation value correction section 23-k employs the timing correction coefficient $\tau\_c_k$, which was acquired by the timing correction coefficient acquisition section 22-$k$ for the UEs 40 selected by the scheduling section 21, to correct the channel estimation values $h_{i,k}(r)$ acquired by the channel estimation section 35-$k$. Namely, as expressed by Equation (3), the timing correction coefficient $\tau\_c_k$ is applied so as to impart a phase rotation to the downlink channel estimation values $h_{i,k}(r)$.

$$h'_{i,k}(r) = h_{i,k}(r) \cdot \exp(j \cdot 2\pi \cdot \Delta\_RB \cdot r \cdot \tau\_c_k) \quad (3)$$

$h'_{i,k}(r)$ is the corrected channel estimation value, and $\Delta\_RB$ is the frequency interval between RBs.

The transmission weight computation section 24 generates a concatenated channel matrix $H'(r)$ that includes a channel estimation value $h'_{i,k}(r)$ for each RB of the antennas 50 with respect to a UE 40-$i$ ($i=1, \ldots, |M|$) acquired by the channel estimation value correction section 23, as expressed by of Equation (4).

$$H'(r) = \begin{bmatrix} h'_{1,1}(r) & \cdots & h'_{1,n}(r) \\ \vdots & \ddots & \vdots \\ h'_{|M|,1}(r) & \cdots & h'_{|M|,n}(r) \end{bmatrix} \quad (4)$$

The transmission weight computation section 24 employs the generated concatenated channel matrix $H'(r)$ to compute transmission weights $W'(r)$ for each RB. The transmission weights $W'(r)$ for each RB may, for example, be computed using zero-forcing (ZF) as expressed by Equation (5).

$$W'(r) = H'^H(r) \cdot (H'(r) \cdot H'(r)^H)^{-1} \cdot P(r) \quad (5)$$

In Equation (5), the superscripted H indicates a Hermitian transpose, and $P(r)$ indicates a diagonal matrix that normalizes transmission weight power.

As expressed by Equation (6), the transmission weight interpolation section 25 interpolates between the transmission weights computed by the transmission weight computation section 24, namely, the transmission weights at each RB frequency interval, $\Delta\_RB$ so as to give transmission weights at subcarrier (also referred to as SC below) frequency intervals.

$$\tilde{w}'_{k,i}(s) = \frac{N\_scrb - (s \% N\_scrb)}{N\_scrb} \cdot w'_{k,i}(\lfloor s/N\_scrb \rfloor) + \frac{s \% N\_scrb}{N\_scrb} \cdot w'_{k,i}(\lceil s/N\_scrb \rceil) \quad (6)$$

The RB frequency interval $\Delta\_RB$ is an example of a first frequency interval, the SC frequency interval is an example of a second frequency interval, and $w_{k,i}'(s)$ with "~" on top, namely, tilde $w_{k,i}'(s)$, is transmission weight after interpolation. N_scrb is the number of SCs for each RB, where s represents an SC number, and $w'_{k,i}(r)$ is the element in the $k^{th}$ row and the $i^{th}$ column of $W'(r)$. Moreover, "%" is an operator, whereby z1%z2 expresses a remainder obtained by dividing z1 by z2.

The transmission weight correction section 27-$k$ employs the timing correction coefficient $\tau\_c_k$ acquired by the timing correction coefficient acquisition section 22-$k$ to correct row number k of the transmission weights acquired by the transmission weight interpolation section 25, as expressed by Equation (7). Namely, the transmission weight correction section 27-$k$ removes the phase rotation imparted to the channel estimation values in Equation (3).

$$w_{k,i}(s) = \tilde{w}_{k,i}'(s) \cdot \exp(j \cdot 2\pi \cdot \Delta\_sc \cdot s \cdot \tau\_c_k) \quad (7)$$

$w_{k,i}(s)$ is the corrected transmission weight, and $\Delta\_sc$ is the SC frequency interval.

The user data generation section 26 generates symbol data for transmission to a UE 40-$i$ selected by the scheduling section 21. The transmission weight multiplication section 28-$k$ multiplies each SC of the symbol data generated by the user data generation section 26 by the transmission weight $w_{k,i}(s)$ that was corrected by the transmission weight correction section 27-$k$.

The IFFT section 36-$k$ performs inverse fast Fourier transform (IFFT) on the symbol data multiplied by the transmission weight $w_{k,i}(s)$ so as to convert the symbol data into a transmission signal in the time domain. The CP appending section 37-$k$ appends CP to the transmission signal that was converted into the time domain. The downlink wireless processing section 38-$k$ up converts the CP-appended transmission signal to a wireless frequency, and performs digital-to-analog (D/A) conversion on the up-converted transmission signal.

Figure 3:
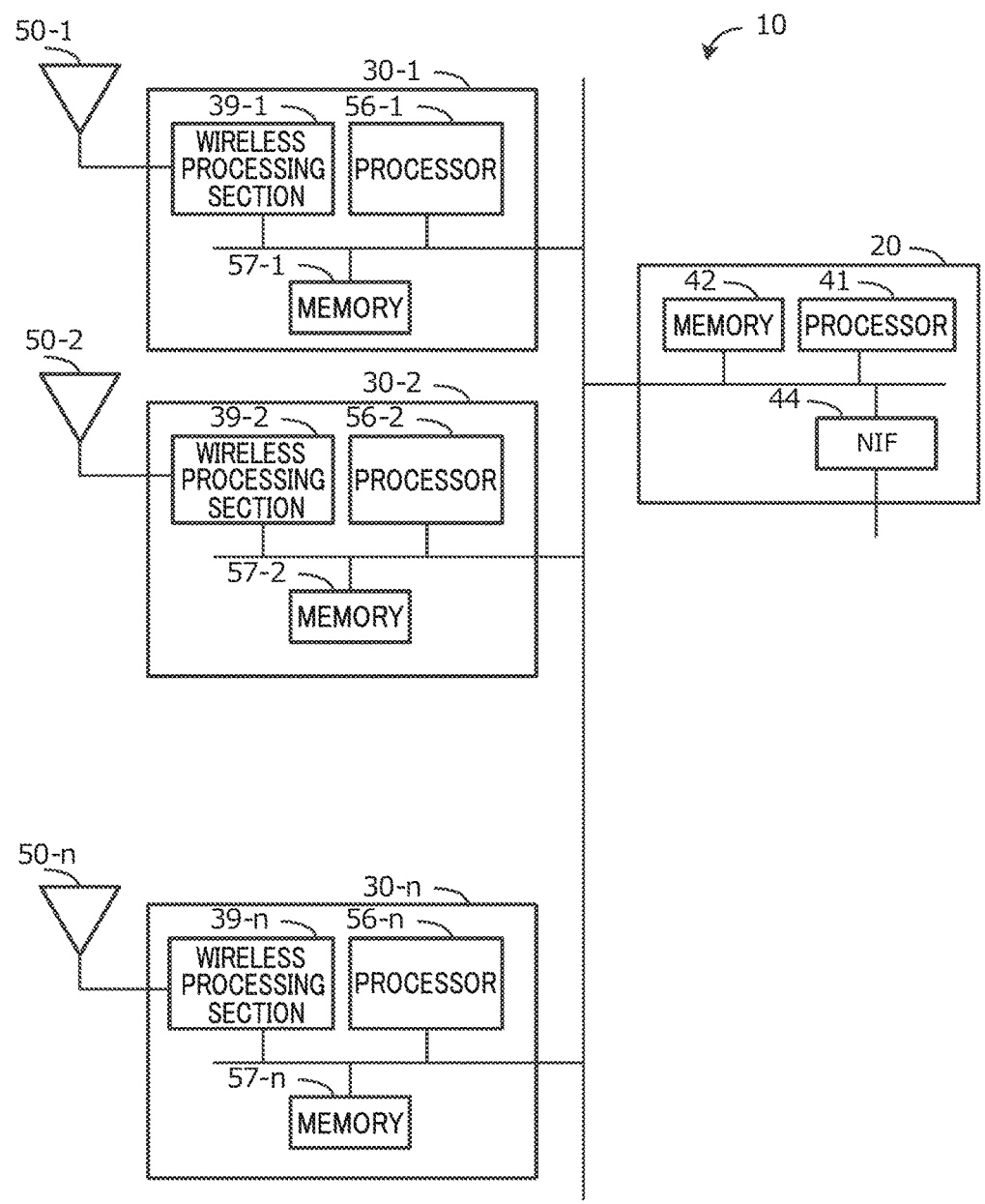
FIG. 3 is a block diagram illustrating an example of hardware configuration for a communication system according to the first exemplary embodiment.

FIG. 3 illustrates an example of hardware configuration for the communication system 10 of the present exemplary embodiment. A description now follows regarding the example of FIG. 3 in which each TP 30-$k$ ($k=1, \ldots, n$) is connected to the CBBU 20.

The CBBU 20 includes a processor 41, memory 42, and a network interface (NIF) 44. The NIF 44 is, for example, an interface section to connect to higher-level devices, such as a gateway device of a functional network.

The memory 42 holds a communication processing program. The processor 41 reads the communication processing program from the memory 42 and executes the communication processing program so as to respectively function as the scheduling section 21, the timing correction coefficient acquisition sections 22-$k$, and the channel estimation value correction sections 23-$k$ in FIG. 2. By reading the communication processing program from the memory 42 and executing the communication processing program, the processor 41 also respectively functions as the transmission weight computation section 24, the transmission weight interpolation section 25, the user data generation section 26, the transmission weight correction sections 27-$k$, and the transmission weight multiplication sections 28-$k$ in FIG. 2.

Each TP 30-$k$ includes a wireless processing section 39-$k$, a processor 56-$k$, and memory 57-$k$. The wireless processing section 39-$k$ includes the uplink wireless processing section 31-$k$, the CP removal section 32-$k$, the FFT section 33-$k$, the IFFT section 36-$k$, the CP appending section 37-$k$, and the downlink wireless processing section 38-$k$ illustrated in FIG. 2. The memory 57-$k$ holds a supplementary communication processing program. The processor 56-$k$ reads the supplementary communication processing program from the memory 57-$k$ and executes the supplementary communication processing program so as to respectively function as the reception timing detection sections 34-$k$ and the channel estimation sections 35-$k$ in FIG. 2.

The processor 41 and the processors 56-$k$ may, for example, be configured by a central processing unit (CPU), a Field Programmable Gate Array (FPGA), or a Digital Signal Processor (DSP). The memory 42 and the memory 57-$k$ may, for example, be configured by random access memory (RAM) or read only memory (ROM).

Figure 4:
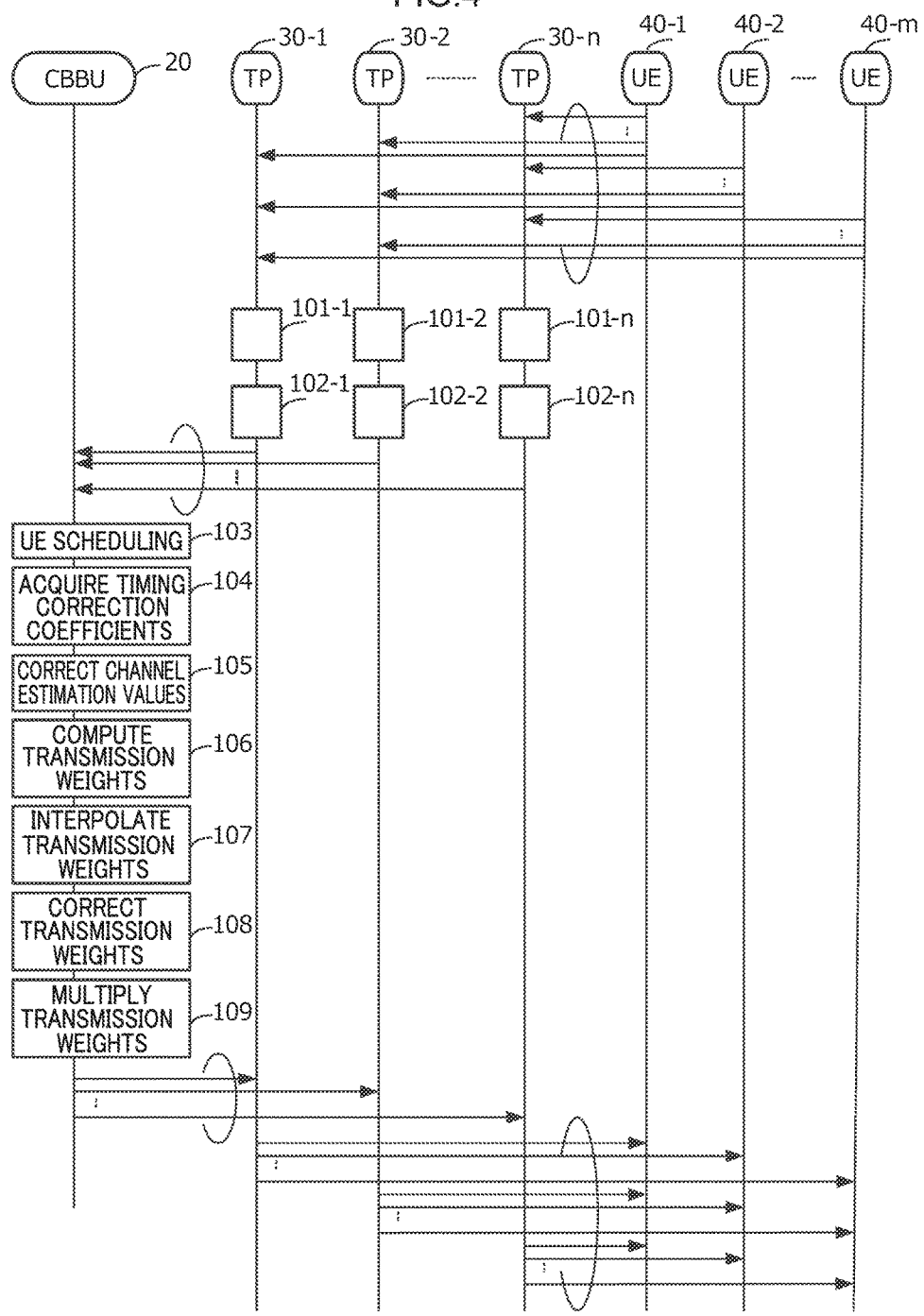
FIG. 4 is a flowchart illustrating an example flow of communication processing according to the first exemplary embodiment.

FIG. 4 illustrates an example flowchart for the present exemplary embodiment. In FIG. 4, each TP 30-$k$ ($k=1, \ldots, n$) is connected to the CBBU 20 and there are UEs 40-$i$ ($i=1, \ldots, m$) present.

At step 101-$k$, the processor 56-$k$ of TP 30-$k$ employs a known signal, such as an SRS, contained in the received signal from a UE 40-*i* to detect a reception timing $\tau_{i,k}$ at the antenna 50-*k* of an uplink signal from the UE 40-*i* to the antenna 50-*k*. At step 102-*k*, the processor 56-*k* employs a known signal, such as an SRS, to acquire an uplink channel estimation value, and converts the acquired uplink channel estimation value to a downlink channel estimation value $h_{i,k}(r)$.

At step 103, based on the downlink channel estimation values $h_{i,k}(r)$, the processor 41 of the CBBU 20 selects UEs 40-*i* (i=1, ..., |M|) for multiplexed signal transmission from out of the UEs 40 being scheduled. At step 104, based on the reception timings $\tau_{i,k}$ and information relating to the UEs 40-*i* selected at step 103 for multiplexed signal transmission, the processor 41 determines a timing correction coefficient $\tau\_c_k$ for each antenna 50-*k*.

At step 105, the processor 41 employs the timing correction coefficients $\tau\_c_k$ acquired at step 104 to correct the channel estimation values $h_{i,k}(r)$ acquired at step 102-*k*. At step 106, the processor 41 computes transmission weights W'(r) based on the channel estimation values corrected at step 105. At step 107, the processor 41 interpolates between the transmission weights at each RB frequency interval so as to give transmission weights at SC frequency intervals.

At step 108, the processor 41 employs the timing correction coefficients $\tau\_c_k$ acquired at step 104 to correct the transmission weights interpolated at step 107. At step 109, the processor 41 multiplies the symbol data in each SC transmitted to the UE 40-*i* by the corrected transmission weights.

Although an example has been described in which the timing correction coefficient $\tau\_c_k$ is the reception timing $\tau_{i,k}$ of the UE 40 having the earliest reception timing, the present exemplary embodiment is not limited thereto. For example, the received power $p\_rx_{i,k}$ and reception timings $\tau_{i,k}$ of received signals from the selected UEs 40-*i* (i=1, ..., |M|) may be employed to compute a weighted average of reception timings $\tau_{i,k}$, which is then employed as the timing correction coefficient $\tau\_c_k$, as expressed by Equation (8) below. The received power $p\_rx_{i,k}$ at the antenna 50-*k* of the uplink signal from a UE 40-*i* to the antenna 50-*k* is detected by the reception timing detection section 34-*k* employing a known signal, such as an SRS.

$$\tau\_c_k = \frac{\sum_{i \in M} p\_rx_{i,k} \cdot \tau_{i,k}}{\sum_{i \in M} p\_rx_{i,k}} \quad (8)$$

However, in cases in which the UEs 40-*i* control uplink transmission power, $p_{i,k}$ is employed in place of received power $p\_rx_{i,k}$, as expressed by Equation (9).

$$p_{i,k} = p\_rx_{i,k} - p\_tx_i \quad (9)$$

$p\_tx_i$ is the transmission power value of UE 40-*i* and may, for example, be estimated by employing the uplink power headroom (UPH) reported by the UE 40-*i*.

Moreover, the timing correction coefficient $\tau\_c_k$ may be computed as expressed by Equation (10). Equation (10) differs from Equation (8) in that $p\_rx_{i,k} \cdot \tau_{i,k}$ is multiplied by a coefficient coe. The coefficient coe is a value determined based on the received power $p\_rx_{i,k}$, and may, for example, be set to 1 when the received power $p\_rx_{i,k}$ exceeds a predetermined value, and set to 0 when not exceeding the predetermined value. Moreover, the coefficient coe may be a value that increases in steps as received power increases.

$$\tau\_c_k = \frac{\sum_{i \in M} coe \cdot p\_rx_{i,k} \cdot \tau_{i,k}}{\sum_{i \in M} p\_rx_{i,k}} \quad (10)$$

Figure 5:
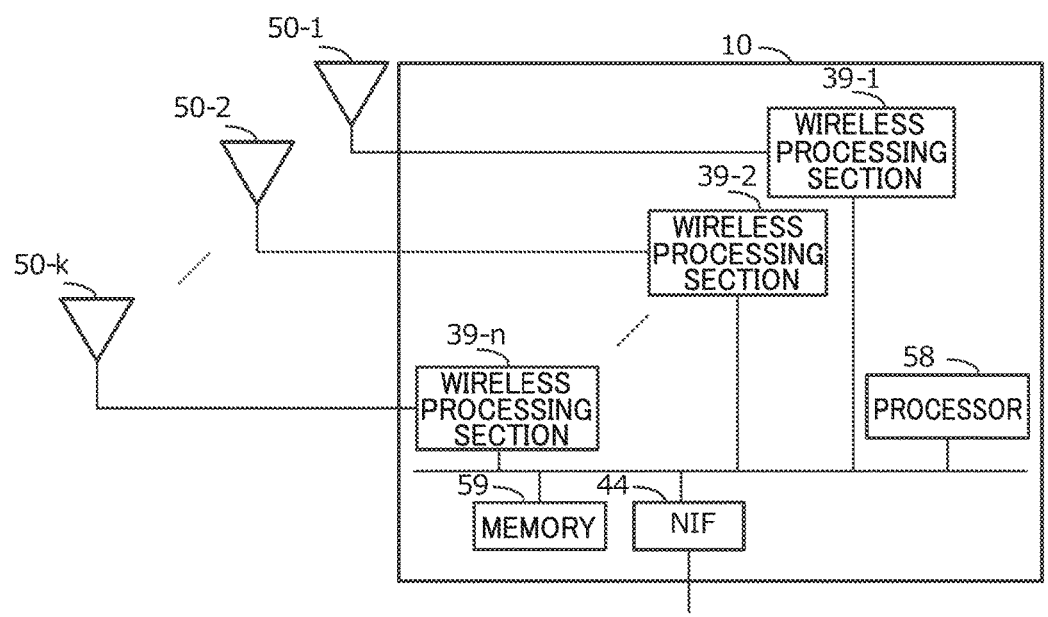
FIG. 5 is a block diagram illustrating an example of hardware configuration for a communication system according to the first exemplary embodiment.

Note that although an example has been described in which the CBBU 20 and the TPs 30-*k* are separate bodies in FIG. 3, the present exemplary embodiment is not limited thereto. For example, as illustrated in FIG. 5, the communication system 10 may be configured with the CBBU 20 and the TPs 30-*k* integrated together. The communication system 10 of FIG. 5 includes a processor 58, memory 59, a NIF 44, and wireless processing sections 39-*k* (k=i, ..., n). The memory 59 holds a communication processing program and a supplementary communication processing program. The processor 58 functions as the CBBU by reading and executing the communication processing program, and functions as the TP by the processor 58 reading and executing the supplementary communication processing program.

The processor 58 may, for example, be configured by a CPU, FPGA, or DSP. The memory 59 may, for example, be configured by RAM or ROM.

Note that although an example has been described in which the transmission weight multiplication sections 28-*k* and the transmission weight correction sections 27-*k* are included in the CBBU 20 in FIG. 2, the present exemplary embodiment is not limited thereto. The transmission weight multiplication sections 28-*k* and the transmission weight correction sections 27-*k* may be included in the TPs 30-*k*.

Note that although an example has been described in which the TPs 30-*k* (or the wireless processing sections 39-*k*) each include a single antenna 50-*k*, the present exemplary embodiment is not limited thereto. Two or more of the antennas 50 may be connected to a single TP 30 (or to a single wireless processing section 39). In such cases the total number of the TPs 30 (or the wireless processing sections 39) is smaller than the total number n of the antennas.

Note that although an example has been described in which transmission weights computed at RB frequency intervals are interpolated at SC frequency intervals, the present exemplary embodiment is not limited thereto. For example, the transmission weights may be interpolated at sub-band frequency intervals covering a predetermined number of SCs. Note that although an example has been described in which the transmission weights are computed using zero-forcing, the present exemplary embodiment is not limited thereto. The transmission weights may, for example, be computed using diagonalized blocks.

The timing correction coefficient acquisition sections of the present exemplary embodiment acquire timing correction coefficients to apply to each of plural antennas based on the reception timings of uplink signals from plural wireless terminals that receive multiplexed downlink signals transmitted from the plural antennas. Based on the timing correction coefficients acquired by the timing correction coefficient acquisition sections, and on the respective channel estimation values between the plural antennas and the plural wireless terminals, the computation section computes reflected transmission weights at first frequency intervals that reflect the timing correction coefficients. The transmission weight interpolation section computes interpolated transmission weights by interpolating between the reflected transmission weights computed by the computation section at second frequency intervals that are narrower than the first frequency intervals. The transmission weight correction section computes transmission weights to be applied to downlink signals by correcting the interpolated transmission weights interpolated by the transmission weight interpolation section based on the timing correction coefficients, such that the timing correction coefficients are reflected a second time.

The computation section includes the channel estimation value correction section and the transmission weight computation section. The channel estimation value correction section corrects the channel estimation values based on the timing correction coefficients, and the transmission weight computation section computes the reflected transmission weights at the first frequency intervals based on the corrected channel estimation values that have been corrected by the channel estimation value correction section.

In the present exemplary embodiment, channel estimation values between each of plural antennas and plural wireless terminals are corrected for a set of plural wireless terminals using timing correction coefficients for each antenna. The timing correction coefficients suppress phase rotation, and are employed to impart phase rotation to the channel estimation values such that transmission weights are computed based on the channel estimation values in a state in which fluctuations in phase with respect to frequency due to timing offsets are suppressed. After the interpolation of transmission weights, the timing correction coefficients are employed to correct the transmission weights so as to remove the imparted phase rotation. The present exemplary embodiment thereby enables the acquisition of appropriate transmission weights to be applied to downlink signals from plural antennas to plural wireless terminals.

Second Exemplary Embodiment

An example second exemplary embodiment will now be described. Description will be omitted for configuration and operation similar to that of the first exemplary embodiment. The second exemplary embodiment differs from the first exemplary embodiment in that channel estimation value correction is not performed, and that transmission weights are corrected prior to interpolating the transmission weights.

Figure 6:
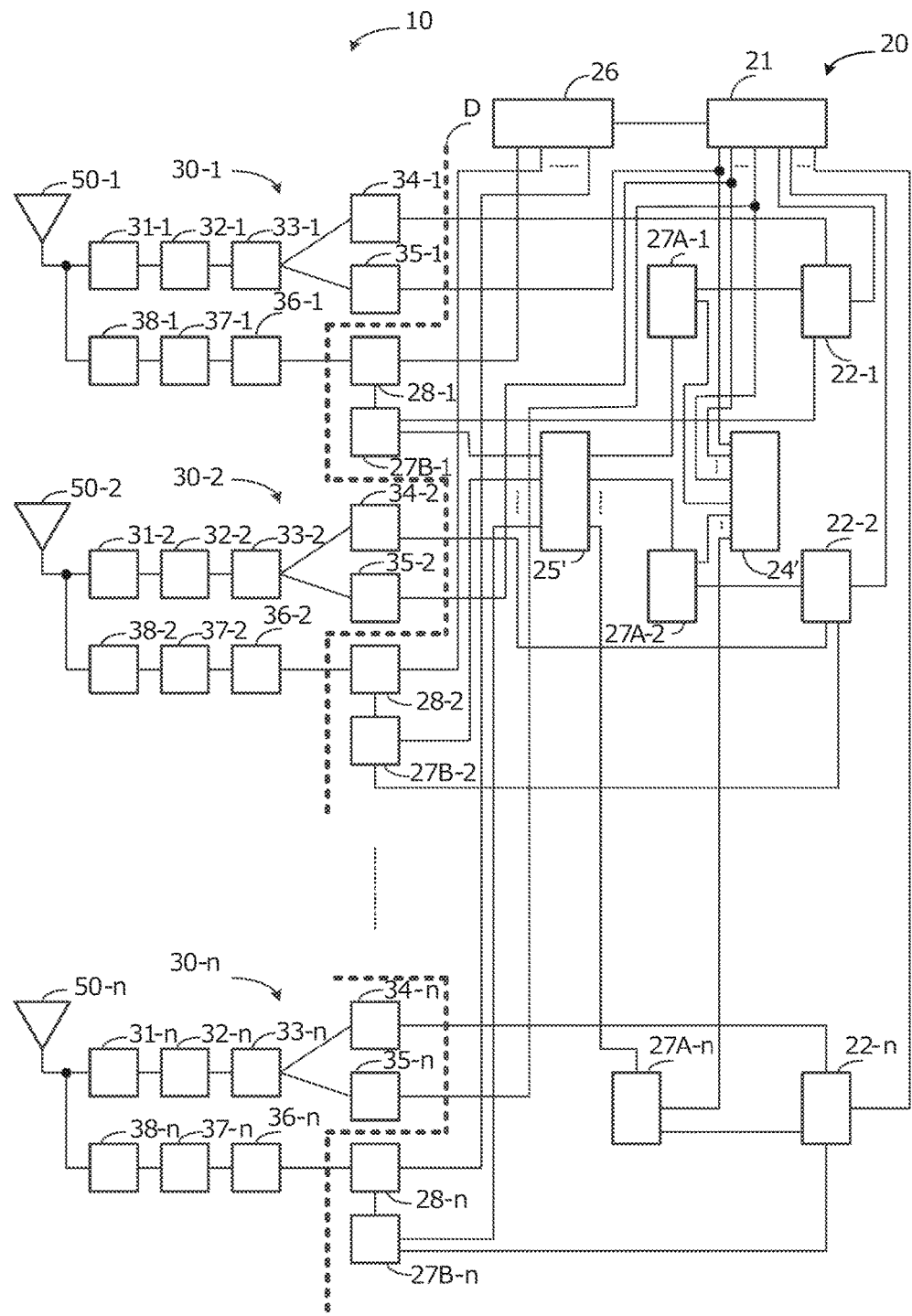
FIG. 6 is a block diagram illustrating an example of relevant functionality of a communication system according to the second exemplary embodiment.

FIG. 6 illustrates an example block diagram for a communication system 10 of the second exemplary embodiment. In FIG. 6, each TP 30-$k$ ($k=1, \ldots, n$) is connected to a CBBU 20. The second exemplary embodiment diverges from the communication system 10 of FIG. 2 in that the channel estimation value correction sections 23-$k$ in FIG. 2 described in the first exemplary embodiment are not present, and that first transmission weight correction sections 27A-$k$ are present between a transmission weight computation section 24' and a transmission weight interpolation section 25'.

The transmission weight computation section 24' concatenates the UEs 40-$i$ ($i=1, \ldots, |M|$) acquired by channel estimation sections 35-$k$ and downlink channel estimation values $h_{i,k}(r)$ for antennas 50-$k$ ($k=1, \ldots, n$) to generate a concatenated channel matrix $H(r)$, as expressed by Equation (11).

$$H(r) = \begin{bmatrix} h_{1,1}(r) & \ldots & h_{1,n}(r) \\ \vdots & \ddots & \vdots \\ h_{|M|,1}(r) & \ldots & h_{|M|,n}(r) \end{bmatrix} \quad (11)$$

The transmission weight computation section 24' employs the concatenated channel matrix H'(r) to compute transmission weights W(r). The transmission weights W(r) may, for example, be computed using zero-forcing as expressed by Equation (12).

$$W(r) = H^H(r) \cdot (H(r) \cdot H(r)^H)^{-1} \cdot P(r) \quad (12)$$

The first transmission weight correction section 27A-k corrects the transmission weights W(r) computed by the transmission weight computation section 24' using the timing correction coefficient $\tau\_c_k$ acquired by the timing correction coefficient acquisition section 22-$k$, as expressed by Equation (13). The transmission weight computation section 24' and the first transmission weight correction sections 27A-k are an example of a computation section.

$$w_{k,i}'(r) = w_{k,i}(r) \cdot \exp(-j \cdot 2\pi \cdot \Delta\_RB \cdot r \tau\_c_k) \quad (13)$$

$w_{k,i}'(r)$ is a corrected transmission weight, and $w_{k,i}(r)$ indicates the element in row k and column i of W(r) in Equation (12), namely, the transmission weight corresponding to antenna 50-$k$ and UE 40-$i$.

The transmission weight interpolation section 25' interpolates between transmission weights $w'_{k,i}(r)$ corrected by the first transmission weight correction sections 27A-k, namely transmission weights at each RB frequency interval, so as to give transmission weights at SC frequency intervals, as expressed by Equation (14).

$$\tilde{w}'_{k,i}(s) = \frac{N\_scrb - (s \% N\_scrb)}{N\_scrb} \cdot w'_{k,i}(\lfloor s/N\_scrb \rfloor) + \frac{s \% N\_scrb}{N\_scrb} \cdot w'_{k,i}(\lceil s/N\_scrb \rceil) \quad (14)$$

Second transmission weight correction sections 27B-k employ the timing correction coefficients $\tau\_c_k$ acquired by the timing correction coefficient acquisition sections 22-$k$ to correct the transmission weights interpolated by the transmission weight interpolation section 25', as expressed by Equation (15). Namely, the second transmission weight correction sections 27B-k remove the phase rotation imparted to the transmission weights in Equation (13).

$$w_{k,i}(s) = \tilde{w}_{i,k}'(s) \cdot \exp(j \cdot 2\pi \cdot \Delta\_sc \cdot s \tau\_c_k) \quad (15)$$

Figure 7:
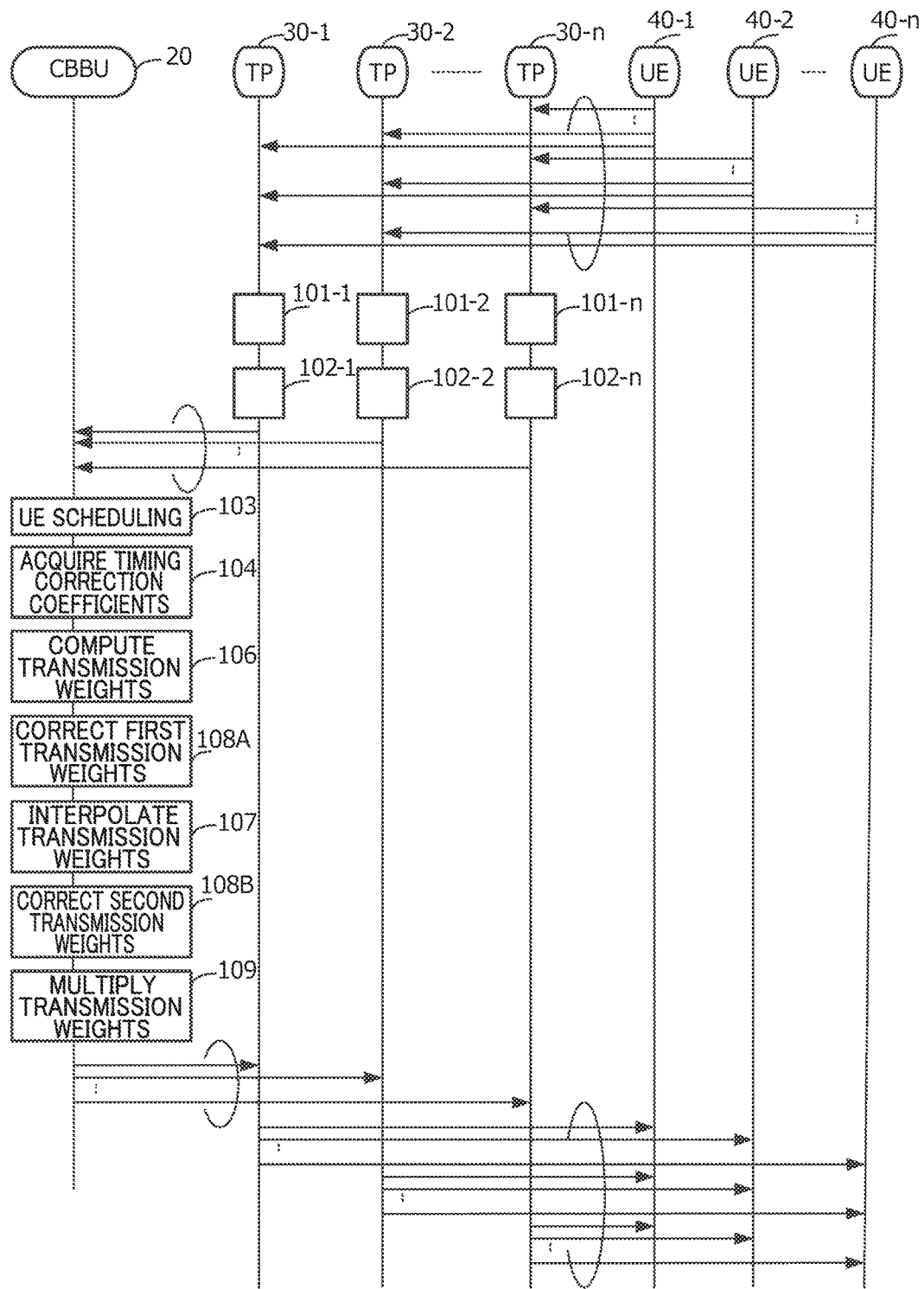
FIG. 7 is a flowchart illustrating an example flow of communication processing according to the second exemplary embodiment.

FIG. 7 illustrates an example flowchart for the present exemplary embodiment. In FIG. 7, each TP 30-$k$ ($k=1, \ldots, n$) is connected to the CBBU 20 and there are UEs 40-$i$ ($i=1, \ldots, m$) present.

At step 104, based on the reception timings $\tau_{i,k}$ and information relating to the UEs 40-$i$ selected at step 103 for multiplexed signal transmission, the processor 41 of the CBBU 20 determines a timing correction coefficient $\tau\_c_k$ for each antenna 50-$k$. At step 106, the processor 41 computes transmission weights W(r) based on the uncorrected downlink channel estimation values $h_{i,k}(r)$. At step 108A, the processor 41 employs the timing correction coefficients $\tau\_c_k$ acquired at step 104 to correct the transmission weights W(r) computed at step 106.

At step 107, the processor 41 interpolates between the transmission weights at each RB frequency interval so as to give transmission weights at SC frequency intervals. At step 108B, the processor 41 employs the timing correction coefficients $\tau\_c_k$ acquired at step 104 to correct the transmission weights interpolated at step 107.

Note that although an example has been described in which the second transmission weight correction sections 27B-k and the transmission weight multiplication sections 28-$k$ are included in the CBBU 20, the present exemplary embodiment is not limited thereto. For example, the second transmission weight correction sections 27B-k and the transmission weight multiplication sections 28-k may be included in the TPs 30-k.

The timing correction coefficient acquisition sections of the present exemplary embodiment acquire timing correction coefficients to apply to each of plural antennas based on the reception timing of the uplink signals from plural wireless terminals that receive multiplexed downlink signals transmitted from the plural antennas. Based on the timing correction coefficients acquired by the timing correction coefficient acquisition sections, and on the respective channel estimation values between the plural antennas and the plural wireless terminals, the computation section computes reflected transmission weights at first frequency intervals that reflect the timing correction coefficients. The transmission weight interpolation section computes interpolated transmission weights by interpolating between the reflected transmission weights computed by the computation section at second frequency intervals that are narrower than the first frequency intervals. The transmission weight correction section computes transmission weights to be applied to downlink signals by correcting the interpolated transmission weights interpolated by the transmission weight interpolation section based on the timing correction coefficients, such that the timing correction coefficients are reflected a second time.

The computation section includes the transmission weight computation section and the transmission weight correction section. Based on the channel estimation values, the transmission weight computation section computes transmission weights prior to having the timing correction coefficient reflected therein at the first frequency intervals. Based on the timing correction coefficients, the transmission weight correction section corrects the transmission weights computed by the transmission weight computation section, thereby computing reflected transmission weights.

In the present exemplary embodiment, downlink-signal-multiplying transmission weights are corrected for a set of plural wireless terminals using timing correction coefficients for each antenna. The timing correction coefficients suppress phase rotation, and are employed such that transmission weights are interpolated in a state in which phase rotation has been imparted, namely, in which fluctuations in phase with respect to frequency due to timing offsets are suppressed. The timing correction coefficients are employed to correct the transmission weights so as to remove the imparted phase rotation from the transmission weights. The present exemplary embodiment thereby enables the acquisition of appropriate transmission weights to be applied to downlink signals from plural antennas to plural wireless terminals.

Related Technology

An example of related technology will now be described.

Figure 8:
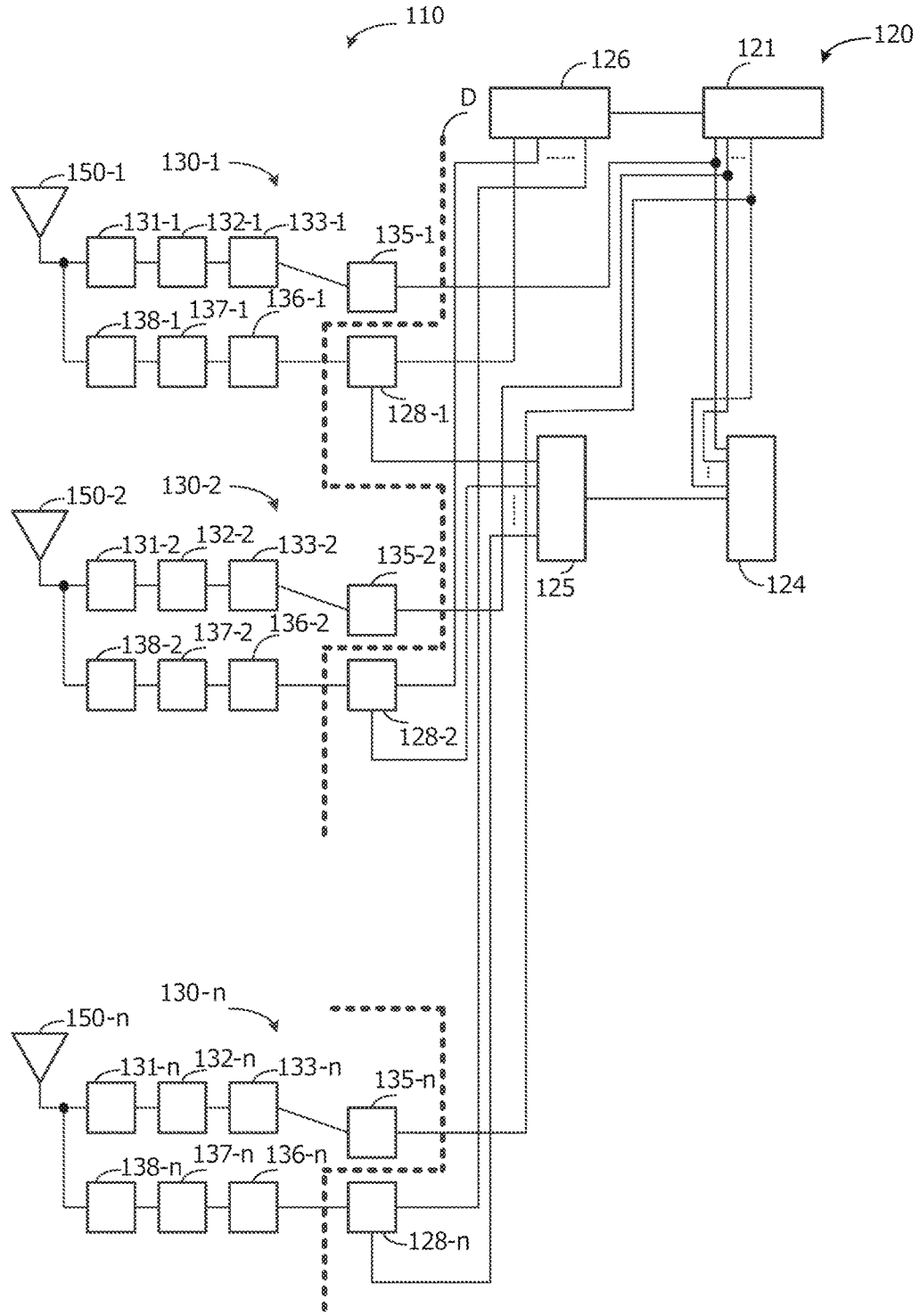
FIG. 8 is a block diagram illustrating an example of relevant functionality of a communication system according to related technology.

FIG. 8 illustrates a communication system 110 of related technology. A CBBU 120 is illustrated on the right side of the broken line D in FIG. 8, and TPs 130-k (k=1, . . . , n) connected to the CBBU 120 are illustrated on the left side of the broken line D.

The communication system 110 differs from the communication system 10 of the first exemplary embodiment in that it does not include configuration elements corresponding to timing correction coefficient acquisition sections 22-k, channel estimation value correction sections 23-k, transmission weight correction sections 27-k, or reception timing detection sections 34. The communication system 110 also differs from the communication system 10 of the second exemplary embodiment in that it does not include timing correction coefficient acquisition sections 22-k, first transmission weight correction sections 27A-k, second transmission weight correction sections 27B-k, or reception timing detection sections 34-k.

The CBBU 120 includes a scheduling section 121, a transmission weight computation section 124, a transmission weight interpolation section 125, a user data generation section 126, and a transmission weight multiplication section 128-k. Each TP 130-k includes an uplink wireless processing section 131-k, a CP removal section 132-k, a FFT section 133-k, a channel estimation section 135-k, an IFFT section 136-k, a CP appending section 137-k, and a downlink wireless processing section 138-k.

The uplink wireless processing section 131-k, the CP removal section 132-k, and the FFT section 133-k are similar to the uplink wireless processing section 31-k, the CP removal section 32-k, and the FFT section 33-k in FIG. 2, and so description thereof is omitted. The IFFT section 136-k, the CP appending section 137-k, and the downlink wireless processing section 138-k are similar to the IFFT section 36-k, the CP appending section 37-k, and the downlink wireless processing section 38-k in FIG. 2, and so description thereof is also omitted. Further, the channel estimation section 135-k is similar to the channel estimation section 35-k of FIG. 2, and so description thereof is omitted.

Figure 9:
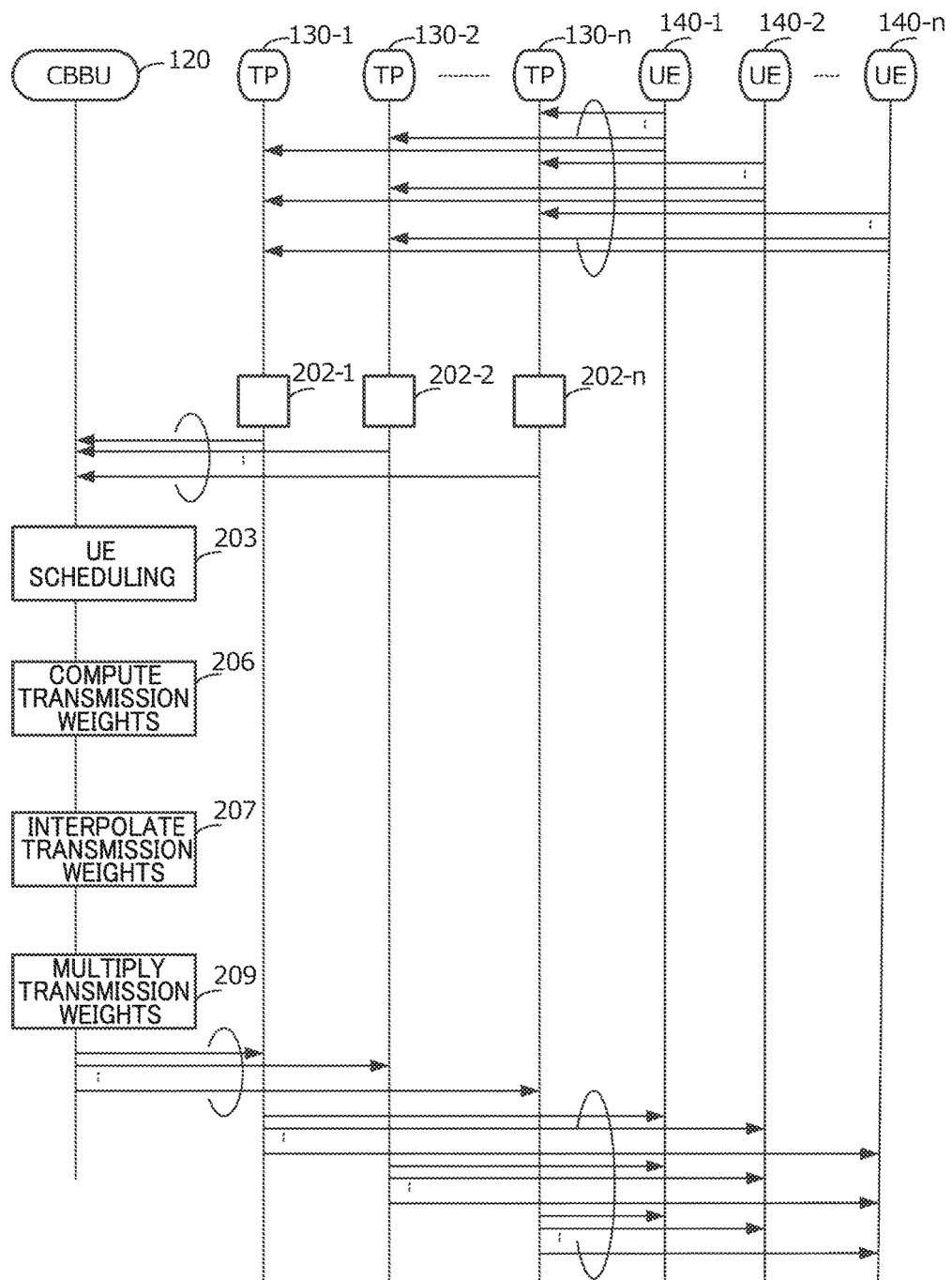
FIG. 9 is a flowchart illustrating an example flow of communication processing according to the related technology.

FIG. 9 illustrates an example flow of communication processing in the related technology. The flow of communication processing in the related technology differs from the flow of communication processing of the first exemplary embodiment in that it does not include steps corresponding to step 101-k, steps 104 to 105, or step 108. The flow of communication processing in the related technology also differs from the flow of communication processing in the second exemplary embodiment in that it does not include steps corresponding to step 101-k, step 104, step 108A, or step 108B.

In the related technology, the processors of the TPs 130-k acquire channel estimation values at step 202-k. At step 203, the processor of the CBBU 120 selects UEs 140-i ((i=1, . . . , |M|) to transmit a signal to using multiplexed transmission based on the channel estimation values.

Figure 10:
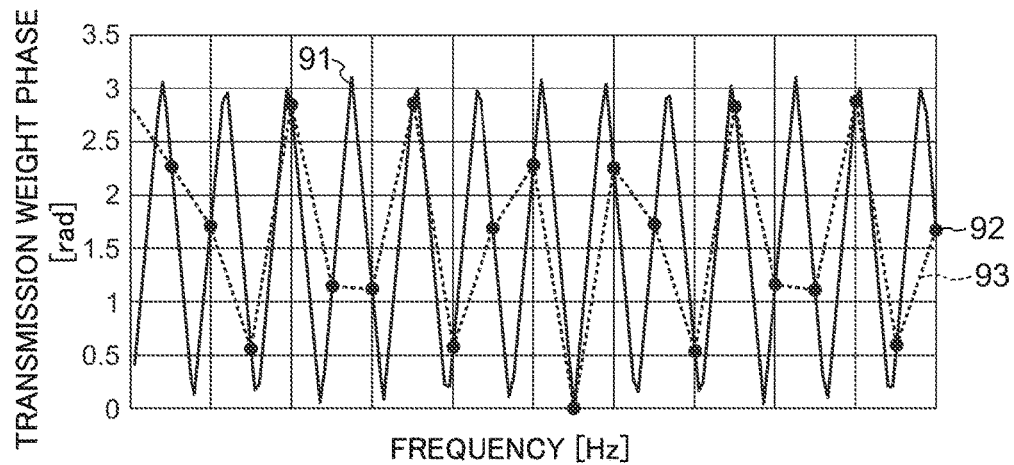
FIG. 10 is a graph illustrating an example of fluctuations in phase for transmission weights as a function of frequency according to the related technology.

At step 206, the processor of the CBBU 120 computes transmission weights based on the channel estimation values acquired at step 202, and at step 207, the processor of the CBBU 120 interpolates between the transmission weights at each RB frequency interval so as to give transmission weights at SC frequency intervals. At step 209, the processor of the CBBU 120 multiplies each SC of the symbol data to be transmitted to a UE 140-i by the respective interpolated transmission weights FIG. 10 illustrates a relationship between the phase of transmission weights acquired by the related technology and frequency. Transmission weight phase (rad) is depicted on the vertical axis, and frequency (Hz) is depicted on the horizontal axis. The solid line 91 indicates the phase of optimal transmission weights. Points 92 indicate the phase of transmission weights computed at step 206, and the broken line 93 indicates the phase of transmission weights interpolated at step 207. The points 92 generally lie on the solid line 91 that indicates the phase of optimal transmission weights. However, the broken line 93 deviates greatly from the solid line 91.

Figure 11:
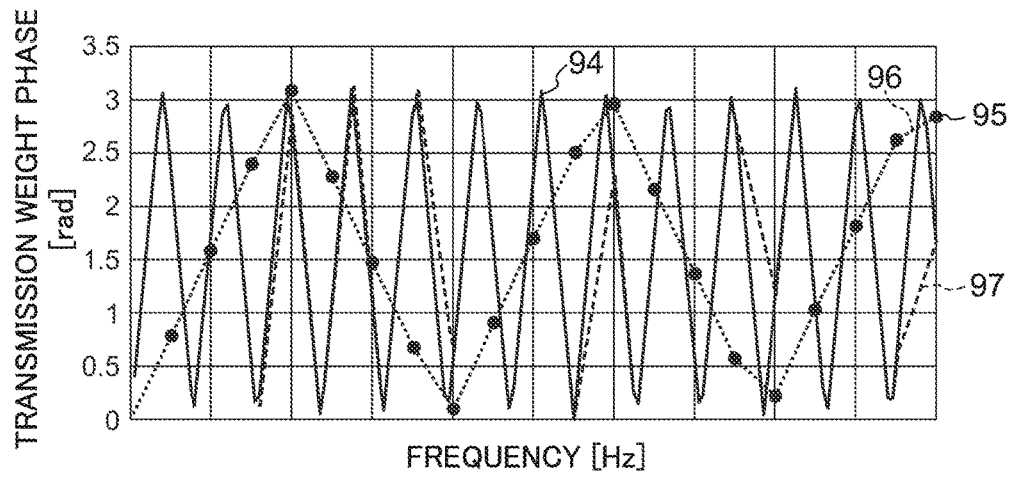
FIG. 11 is a graph illustrating an example of fluctuations in phase for transmission weights as a function of frequency according to the second exemplary embodiment.

FIG. 11 illustrates a relationship between the phase of transmission weights acquired by the second exemplary embodiment and frequency. Transmission weight phase (rad) is depicted on the vertical axis, and frequency (Hz) is depicted on the horizontal axis. The solid line 94 indicates the phase of optimal transmission weights. Points 95 indicate the phase of transmission weights corrected at step 108A, the broken line 96 indicates the phase of transmission weights interpolated at step 107, and the broken line 97 indicates the phase of transmission weights corrected at step 108B.

In the present exemplary embodiment, phase rotation is imparted to the transmission weight at first frequency intervals so as to suppress fluctuations in phase with respect to frequency due to timing offsets. Then transmission weights are interpolated at second frequency intervals that are narrower than the first frequency intervals, and phase rotation that had been imparted is removed from the interpolated transmission weights. The present exemplary embodiment thereby enables the acquisition of transmission weights approximating optimal transmission weights.

There is also a related technology that obviates the interpolation of transmission weights by limiting the UEs receiving multiplexed downlink signals to the UEs for which a difference in propagation delays from the TPs is smallest, and adjusting the transmission timings from the TPs so as to make the reception timings at the UEs closer together. However, in this technology, the combinations of UEs are limited, and there is a chance that the number of UEs capable of receiving multiplexed downlink signals may be reduced. Moreover, for UEs with small propagation delay differences, it is highly likely that propagation losses from the TPs will converge, making orthogonalization of the downlink signals difficult.

On the other hand, the present disclosure enables the acquisition of appropriate transmission weights to be applied to downlink signals from plural antennae to plural wireless terminals.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device comprising:
   a memory; and
   a processor connected to the memory, the processor being configured to:
   compute reflected transmission weights based on timing correction coefficients to be applied to each of a plurality of antennas according to reception timings of uplink signals from a plurality of wireless terminals that receive multiplexed downlink signals transmitted from the plurality of antennas, and on respective channel estimation values between the plurality of antennas and the plurality of wireless terminals, the computed reflected transmission weights reflecting the timing correction coefficients and being computed at first frequency intervals;
   compute interpolated transmission weights by interpolating between the computed reflected transmission weights at second frequency intervals that are narrower than the first frequency intervals; and
   compute transmission weights to be applied to downlink signals by, based on the timing correction coefficients, correcting the interpolated transmission weights that have been interpolated such that the timing correction coefficients are reflected a second time.

2. The communication device of claim 1, wherein the processor is configured to:
   correct the channel estimation values based on the timing correction coefficients; and
   compute the reflected transmission weights at the first frequency intervals based on the corrected channel estimation values that have been corrected.

3. The communication device of claim 1, wherein the processor is configured to:
   based on the channel estimation values, compute transmission weights at the first frequency intervals prior to reflecting the timing correction coefficients; and
   compute the reflected transmission weights by correcting the computed transmission weights based on the timing correction coefficients.

4. The communication device of claim 1, wherein the respective timing correction coefficient for each antenna of the plurality of antennas is a shortest reception timing from reception timings of uplink signals from the plurality of wireless terminals respectively received by that antenna.

5. The communication device of claim 1, wherein the respective timing correction coefficient for each antenna of the plurality of antennas is a weighted average value of the reception timings computed based on reception timings and received power values of uplink signals from the plurality of wireless terminals respectively received by that antenna.

6. The communication device of claim 1, wherein:
   the first frequency intervals are frequency intervals of resource blocks included in the downlink signals; and
   the second frequency intervals are frequency intervals of subcarriers included in the resource blocks.

7. A communication system comprising:
   a memory; and
   a processor connected to the memory, the processor being configured to:
   detect reception timings of uplink signals from a plurality of wireless terminals that receive multiplexed downlink signals transmitted from a plurality of antennas;
   acquire respective channel estimation values between the plurality of antennas and the plurality of wireless terminals relating to downlink signals from the plurality of antennas to the plurality of wireless terminals;
   compute reflected transmission weights based on timing correction coefficients to be applied to each of the plurality of antennas according to the acquired reception timings, and on respective channel estimation values between the plurality of antennas and the plurality of wireless terminals, the computed reflected transmission weights reflecting the timing correction coefficients and being computed at first frequency intervals;
   compute interpolated transmission weights by interpolating between the computed reflected transmission weights at second frequency intervals that are narrower than the first frequency intervals; and
   compute transmission weights to be applied to downlink signals by, based on the timing correction coefficients, correcting the interpolated transmission weights that have been interpolated such that the timing correction coefficients are reflected a second time.

8. The communication system of claim 7, wherein the processor is configured to:
    correct the channel estimation values based on the timing correction coefficients; and
    compute the reflected transmission weights at the first frequency intervals based on the corrected channel estimation values that have been corrected.

9. The communication system of claim 7, wherein the processor is configured to:
    based on the channel estimation values, compute transmission weights at the first frequency intervals prior to reflecting the timing correction coefficients; and
    compute the reflected transmission weights by correcting the computed transmission weights based on the timing correction coefficients.

10. The communication system of claim 7, wherein the respective timing correction coefficient for each antenna of the plurality of antennas is a shortest reception timing from reception timings of uplink signals from the plurality of wireless terminals respectively received by that antenna.

11. The communication system of claim 7, wherein the respective timing correction coefficient for each antenna of the plurality of antennas is a weighted average value of the reception timings computed based on reception timings and received power values of uplink signals from the plurality of wireless terminals respectively received by that antenna.

12. The communication system of claim 7, wherein:
    the first frequency intervals are frequency intervals of resource blocks included in the downlink signals; and
    the second frequency intervals are frequency intervals of subcarriers included in the resource blocks.

13. A communication method comprising:
    by a processor,
        computing reflected transmission weights based on timing correction coefficients to be applied to each of a plurality of antennas according to reception timings of uplink signals from a plurality of wireless terminals that receive multiplexed downlink signals transmitted from the plurality of antennas, and on respective channel estimation values between the plurality of antennas and the plurality of wireless terminals, the computed reflected transmission weights reflecting the timing correction coefficients and being computed at first frequency intervals;
        computing interpolated transmission weights by interpolating between the computed reflected transmission weights at second frequency intervals that are narrower than the first frequency intervals; and
        computing transmission weights to be applied to downlink signals by, based on the timing correction coefficients, correcting the interpolated transmission weights that have been interpolated such that the timing correction coefficients are reflected a second time.

14. The communication method of claim 13, wherein computing the reflected transmission weights includes:
    correcting the respective channel estimation values based on the timing correction coefficients; and
    computing the reflected transmission weights at the first frequency intervals based on the corrected channel estimation values that have been corrected.

15. The communication method of claim 13, wherein computing the reflected transmission weights includes:
    based on the channel estimation values, computing transmission weights at the first frequency intervals prior to reflecting the timing correction coefficients; and
    computing the reflected transmission weights by correcting the computed transmission weights based on the timing correction coefficients.

16. The communication method of claim 13, wherein the respective timing correction coefficient for each antenna of the plurality of antennas is a shortest reception timing from reception timings of uplink signals from the plurality of wireless terminals respectively received by that antenna.

17. The communication method of claim 13, wherein the respective timing correction coefficient for each antenna of the plurality of antennas is a weighted average value of the reception timings computed based on reception timings and received power values of uplink signals from the plurality of wireless terminals respectively received by that antenna.

18. The communication method of claim 13, wherein:
    the first frequency intervals are frequency intervals of resource blocks included in the downlink signals; and
    the second frequency intervals are frequency intervals of subcarriers included in the resource blocks.

* * * * *